United States Patent [19]

Peters et al.

[11] Patent Number: 4,586,109
[45] Date of Patent: Apr. 29, 1986

[54] BATCH-PROCESS SILICON CAPACITIVE PRESSURE SENSOR

[75] Inventors: Arthur J. Peters, Norco; Eugene A. Marks, Riverside, both of Calif.

[73] Assignee: Bourns Instruments, Inc., Riverside, Calif.

[21] Appl. No.: 718,136

[22] Filed: Apr. 1, 1985

[51] Int. Cl.[4] .................... H01G 7/00; G01L 9/12; B05D 5/12

[52] U.S. Cl. .................... 361/283; 29/25.41; 73/724; 427/79

[58] Field of Search .................. 361/283; 427/79; 73/718, 724; 29/25.41, 25.42

[56] References Cited

U.S. PATENT DOCUMENTS

| | | | |
|---|---|---|---|
| 3,423,823 | 1/1969 | Ansley | 29/578 |
| 3,634,727 | 1/1972 | Polye | 361/283 X |
| 3,757,414 | 9/1973 | Keller | 29/580 |
| 3,858,097 | 12/1974 | Polye | 361/283 |
| 3,941,629 | 3/1976 | Jaffe | 156/8 |
| 4,121,334 | 10/1978 | Wallis | 29/589 |
| 4,178,621 | 12/1979 | Simonelic et al. | 361/283 |
| 4,184,189 | 1/1980 | Davis et al. | 361/283 |
| 4,204,244 | 5/1980 | Ho | 361/283 |
| 4,225,632 | 9/1980 | Ho | 427/79 |
| 4,380,041 | 4/1983 | Ho | 361/283 |
| 4,386,453 | 6/1983 | Giachino et al. | 29/25.41 |
| 4,388,668 | 6/1983 | Bell et al. | 361/283 |
| 4,389,895 | 6/1983 | Rud | 73/724 |
| 4,390,925 | 6/1983 | Freud | 361/283 |
| 4,405,970 | 9/1983 | Swindal et al. | 361/283 |
| 4,415,948 | 11/1983 | Grantham et al. | 361/283 |
| 4,495,820 | 1/1985 | Shimada et al. | 73/724 |
| 4,517,622 | 5/1985 | Male | 73/718 X |
| 4,542,435 | 9/1985 | Freud et al. | 361/283 |

OTHER PUBLICATIONS

Y. S. Lee et al., "A Batch-Fabricated Silicon Capacitive Pressure Transducer with Low Temperature Sensitivity", *IEEE Transactions on Electronic Device*, vol. ED-29, No. 1, Jan., 1982, pp. 42-48.

*Primary Examiner*—Donald Griffin
*Attorney, Agent, or Firm*—Howard J. Klein; William G. Becker

[57] ABSTRACT

Silicon capacitive pressure sensors are produced by a batch-process method, comprising the steps of: (1) providing first and second wafers of conductive silicon; (2) oxidizing a surface of each wafer with a layer of silicon dioxide; (3) removing a predefined area of the silicon dioxide layer from a first one of the wafers, leaving an exposed surface of unoxidized silicon in the predefined area; (4) superimposing the second wafer onto the first wafer so that the silicon dioxide layer of the second wafer is in contact with the silicon dioxide layer of the first wafer; (5) fusing the two wafers together at their contacting silicon dioxide layers; (6) metallizing selected areas of the outer surfaces of the two wafers to form electrical contacts; and (7) cutting the wafers into individual pressure sensors. Each of the individual sensors so formed has a pair of opposed conductive silicon plates separated by a dielectric gap formed between the predefined unoxidized area of the first wafer and the opposed silicon dioxide layer of the second wafer. At least one of the plates is formed to be deflectable into the gap in response to the application of pressure to its outer surface.

28 Claims, 10 Drawing Figures

BATCH-PROCESS SILICON CAPACITIVE PRESSURE SENSOR

BACKGROUND OF THE INVENTION

The present invention relates generally to the field of pressure sensors and transducers. More particularly, it relates to a capacitive pressure sensor of the type in which the capacitive plates are formed from wafers of conductive silicon, at least one of which is flexed in response to an applied pressure, whereby the capacitance is varied as a function of the applied pressure.

Capacitive pressure sensors are becoming increasingly popular for a number of applications due to their high pressure sensitivity and relatively low temperature sensitivity, as compared to, for example, pressure sensors of the piezoresistive type. While a number of types of capacitive pressure sensors have been developed, the increasing needs for lower cost, simpler structure, and smaller size have resulted in growing interest in the silicon capacitive pressure sensor.

In a capacitive pressure sensor, a pressure-responsive diaphragm forms one of the two plates of a capacitor. Pressure-induced deflection of the diaphragm varies the distance between the two plates, thereby changing the capacitance of the sensor. The change in capacitance, in turn, creates a change in an electrical output signal of the circuit which contains the sensor. For example, the change in capacitance can create a frequency shift which can be translated, by suitable circuitry, into a voltage that is a function, ultimately, of the applied pressure.

In the silicon capacitive pressure sensor, the plates of the capacitor are formed by wafers of silicon, appropriately doped to achieve a suitable degree of conductivity. One (or, possibly, both) of the wafers is configured into a pressure-responsive diaphragm. Spacing between the wafers is maintained by a suitable insulating material, usually glass, to which the wafers are joined by a variety of means, e.g., electrostatic or anodic bonding, glass frit, and metal film brazing. Examples of such devices are disclosed in the following U.S. patents:
  U.S. Pat. No. 3,634,727—Polye
  U.S. Pat. No. 4,405,970—Swindal et al.
  U.S. Pat. No. 4,415,948—Grantham et al.

Of increasing importance in silicon capacitive pressure sensors are the needs to lower the costs and reduce the size of the sensors. Both goals can be achieved through batch-processing techniques. Until fairly recently, however, batch-processing techniques have been applied primarily to piezoresistive pressure sensors and to capacitive pressure sensors of the type employing a conductive silicon diaphragm bonded to a glass or ceramic substrate, with a metallized surface on the substrate providing one capacitor plate, and the diaphragm providing the other. Examples of such "silicon-on-glass" batch-processed capacitive pressure sensors are disclosed in U.S. Pat. No. 4,386,453 to Giachino et al., and in Lee et al., "A Batch-Fabricated Silicon Capacitive Pressure Sensor with Low Temperature Sensitivity", *IEEE Transactions on Electron Devices,* Vol. ED-29, No. 1, January, 1982 (pp. 42–48). The "silicon-on-glass" technology, however, does have some drawbacks. For example, an electrical connection must be provided through the substrate to the metallization on its inner surface that forms one capacitive plate, thereby adding to the complexity of the fabrication process. Also, the substrate material must be carefully selected to provide both good dielectric qualities and close thermal matching to the silicon diaphragm. Thus, a borosilicate glass is usually selected, its coefficient of thermal expansion being workably close, although not identical, to that of silicon.

The above-referenced patents to Swindal et al. and to Grantham et al. disclose recently-developed methods for batch-process fabrication of capacitive pressure sensors employing silicon wafers for both of the capacitor plates. The sensors made by these methods are relatively low in cost and small in size (i.e., approximately 0.5 cm in diameter), with the use of conductive silicon as the capacitor plates allowing external electrical connection to the plates to be made simply by metallizing the external surfaces of the silicon wafers. In these sensors, spacing between the plates is provided by borosilicate glass structures formed on one of the wafers, with the second, pressure-responsive silicon wafer being bonded to the borosilicate glass by "field-assisted" (electrostatic) bonding.

While the sensors and fabrication methods disclosed in the aforementioned patents to Swindal et al. and Grantham et al. offer some advantages in terms of low cost and small size, futher improvements in the technology have been sought. For example, as the diameter of the capacitor plates decreases, the total capacitance of the sensor decreases proportionately, unless the plates are brought closer together. In the prior art, as exemplified by the Swindal et al. and Grantham et al. patents, the spacing between the plates is on the order of 2 to 3 microns. To provide either substantially greater capacitance or substantially smaller plate diameter (either or both of which may be desirable in certain applications), it is necessary to decrease this spacing by as much as an order of magnitude.

As the spacing between the plates decreases, the need to control the spacing with precision increases significantly. In the prior art, this is accomplished by a borosilicate glass layer deposited on one of the silicon wafers. Thus, the precision of the spacing between the plates is dependent upon the precision with which the thickness of the deposited glass layer can be controlled. According to the aforementioned patent to Swindal et al. this precision is ±5%. It would thus be an improvement in the art to achieve at least comparable precision in plate spacing without the additional complexity of a precision glass sputtering process.

Another limitation in the prior art is the use of borosilicate glass as the spacing medium between the two silicon plates. Borosilicate glass is used because the relative thickness of the spacing medium necessitates a material having a coefficient of thermal expansion that is close to that of monocrystalline silicon, in order to prevent the development of structural flaws when the sensor is subjected to widely varying temperatures. Borosilicate glass, however, is prone to a deterioration in structural integrity at temperatures in excess of about 500° C., making such sensors unsuited to many high-temperature applications.

Thus, it can be seen that there is a need for a batch-processing method for fabricating silicon capacitive pressure sensors that yields sensors with small physical dimensions and acceptable capacitance levels, while maintaining low cost and precise dimensional control. The sensors so made should, preferably, be suitable for use in high-temperature environments, and in environments where drastic temperature changes may be experienced.

SUMMARY OF THE INVENTION

Broadly, the present invention is a batch-process method of fabricating silicon capacitive pressure sensors comprising the steps of (1) providing first and second wafers of conductive semiconductor material (e.g., N- or P-doped silicon); (2) oxidizing a surface of each wafer to form a layer of oxidized semiconductor material; (3) removing a predefined area of the oxidized layer from a first one of the wafers, leaving an exposed surface of unoxidized semiconductor material in the predefined area; (4) superimposing the second wafer onto the first wafer so that the oxidized layer of the second wafer is in contact with the oxidized layer of the first wafer around the predefined area; (5) fusing the two wafers together; (6) metallizing selected areas of the outer surfaces of the two wafers to form electrical contacts; and (7) cutting the fused-together wafers into individual pressure sensors. Each of the individual sensors has a pair of opposed conductive semiconductor plates separated by a dielectric gap formed between the predefined unoxidized area of the first wafer and the opposed oxidized layer of the second wafer. One, or possibly both, of the plates is formed (either in its initial thickness or by etching) to be deflectable into the gap in response to the application of pressure to its outer surface.

The present invention also consists of the capacitive pressure sensors fabricated by the above-defined method. In a broad sense, these sensors may be defined as a pair of conductive semiconductor plates separated by a layer of material comprising essentially the fused oxide of the material from which the plates are made.

The present invention, as described above, has several significant advantages. Most obviously, the batch-processing fabrication yields very small pressure sensors (i.e., on the order of 2.5 to 5.0 mm in width and a millimeter or less in overall thickness), at low cost. Moreover, since the spacing between the plates is determined by the thickness of the oxidized layers, and since this thickness can be precisely controlled by well-known techniques, precise dimensional control of the sensors is readily achieved. Furthermore, these oxidizing techniques can provide thicknesses of the oxidized layer as small as 0.1 micron, thereby allowing the sensors to be made with spacing between the plates on the order of one micron or less. Thus, capacitances that are relatively large in proportion to the physical dimensions of the sensor can be readily achieved. In addition, with the thickness of the oxide layer separating the plates being so small, the sensor is better able to withstand exposure to high temperatures and to widely varying temperatures with little likelihood of structural flaws developing as a result of the difference in the respective coefficients of thermal expansion between the plate material and the intervening oxide layer.

In the preferred embodiment, described more fully below, the plates are formed from monocrystalline silicon, with the intervening oxide layer being comprised essentially of silicon dioxide ($SiO_2$). An advantage of this specific embodiment is that the $SiO_2$ layer is able to withstand temperatures well in excess of 1000° C. without structural deterioration. Thus, the good high-temperature characteristics of $SiO_2$, coupled with the thinness of the $SiO_2$ layer, makes silicon sensors constructed in accordance with the present invention well-suited to high-temperature applications.

Thus, the present invention provides small, low-cost, and reliable capacitive pressure sensors with advantageous thermal characteristics. Moreover, the sensors produced in accordance with the present invention are structurally simple, thereby contributing to their reliability and to the low cost of manufacture. The batch-processing techniques employed in the fabrication method also assure a high degree of uniformity of physical, electrical, and thermal characteristics. In addition, the present invention affords greater sensitivity, as compared with prior art batch-processes capacitive sensors, as a result of greater capacitance per unit area. These advantages, as well as others, will be better appreciated from the detailed description that follows:

DETAILED DESCRIPTION OF THE INVENTION

Figure 1:
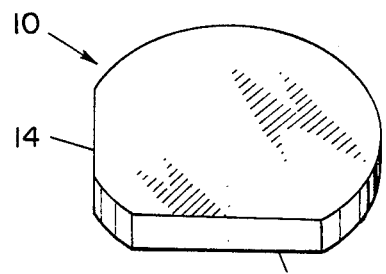
FIGS. 1 through 6 are simplified perspective views of a pair of monocrystalline silicon wafers showing the steps of fabricating silicon capacitive pressure sensors in accordance with the method of the present invention.

Referring now to the drawings, FIG. 1 illustrates, in somewhat idealized form, a typical wafer 10 of monocrystalline silicon, fabricated by techniques well-known in the art. The wafer 10 is grown in the 1-0-0 orientation, with a thickness between 0.25 mm and 0.40 mm. The silicon is doped to attain a bulk resistivity of about 0.005 to about 0.010 ohm-centimeters, with either P-type or N-type dopants being suitable. As is typical with commercially supplied silicon wafers, the wafer 10 has a major flat 12, and a minor flat 14 at 90 degrees from the major flat 12. Both major surfaces of the wafer 10 are polished by well-known techniques.

Figure 2:
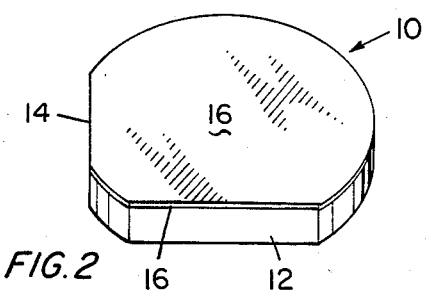

The next step, as illustrated in FIG. 2, is to deposit an essentially pure silicon dioxide ($SiO_2$) layer 16 on the major surfaces of the wafer 10. This is accomplished by thermal oxidation processes which are well-known, comprising the exposure of the wafer 10 to an elevated temperature (1000° C. to 1200° C.) in an oxygen-rich environment. The thickness of the $SiO_2$ layer 16 is preferably about 1.0 to 1.2 microns. This thickness can be precisely controlled, since the oxidation rate for silicon as a function of temperature is well-known.

Figure 3:
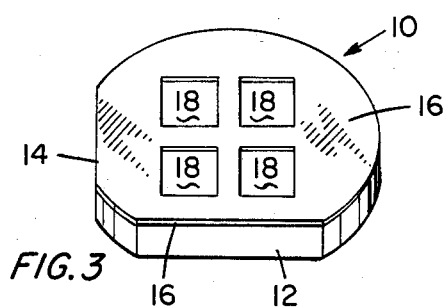

In FIG. 3, the wafer 10 is shown after it has undergone a lithographic process, using standard masking, photo-resist, and etching techniques, to form a matrix of predefined areas 18 wherein the $SiO_2$ layer has been removed, leaving exposed (uncovered) silicon. The pattern of uncovered silicon areas 18 is aligned in parallel with the wafer flats 12 and 14, with the uncovered areas 18 preferably being square or rectangular. The wafer surface surrounding and between the uncovered areas remains, of course, covered by the $SiO_2$ layer 16.

A second silicon wafer 20 (FIG. 4) is provided with physical dimensions and electrically-conductive properties similar to those of the first wafer 10. The second wafer 20 thus has a major flat 12', and a minor flat 14', a thickness of between 0.25 and 0.40 mm, and a bulk resistivity of about 0.005 to 0.010 ohm-centimeters. Its major surfaces are polished, and it is thermally oxidized, as was the first wafer 10, to form an essentially pure $SiO_2$ layer 22. The $SiO_2$ layer 22 on the second wafer 20, however, is provided to a thickness of only about 0.10 to 0.12 microns; that is, about one-tenth the thickness of the $SiO_2$ layer 16 on the first wafer.

Figure 5:
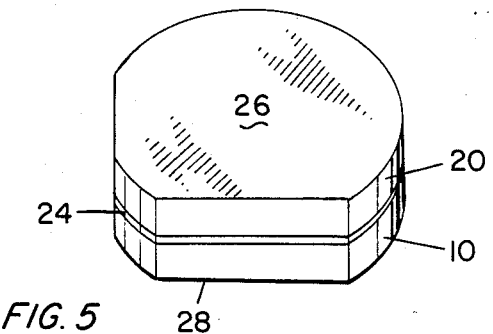

The second wafer 20 is then superimposed on the first wafer 10, with the $SiO_2$ layer 22 of the second wafer being brought into contact with the etched $SiO_2$ layer 16 of the first wafer around and between the predefined areas 18 of exposed silicon on the first wafer. The flats 12' and 14' of the second wafer 20 are respectively aligned with the flats 12 and 14 of the first wafer 10. The superimposed wafers 10 and 20 are then placed in a press, as will be described in more detail below, and are subjected to sufficient heat and pressure to fuse the two $SiO_2$ layers 16 and 22 together. Typically, pressures on the order of 1000 psi and temperatures on the order of 1000° C. are employed. The result is a "sandwich" of the silicon wafers 10 and 20 with an intervening unified layer 24 of silicon dioxide, as shown in FIG. 5. At this point, the $SiO_2$ remaining on the major exterior surfaces (i.e., top and bottom surfaces 26 and 28, respectively), should be removed by conventional chemical solvents, such as hydrofluoric acid.

Figure 6:
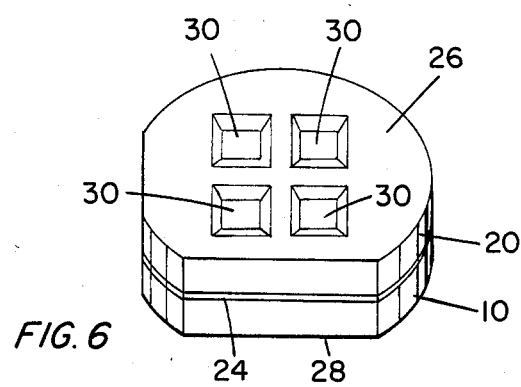

Formation of pressure-responsive diaphragms 30 in the upper surface 26 of the second wafer 20 is illustrated in FIG. 6. This is accomplished by well-known photoresist, masking, and chemical etching techniques, using an anisotropic etchant, such as potassium hydroxide dissolved in water and heated. The diaphragms 30 are formed in a matrix which is aligned and in registration with the matrix of exposed silicon areas 18 on the first (lower) wafer 10, so that each diaphragm 30 overlies one of the exposed silicon areas 18. For many applications, the silicon in the area of the diaphragms should be etched to provide a diaphragm thickness of about 50 microns. This thickness can be varied, however, to accommodate different pressure ranges. After removal of the photo-resist compound, the structure shown in FIG. 6 results.

Figure 7:
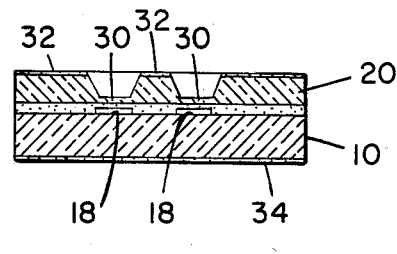
FIG. 7 is a cross-sectional view of a fused-together pair of silicon wafers formed into a completed matrix of sensors prior to the separation of the matrix into individual sensors.

The next step is the metallization of selected areas of the top surface 26 and the bottom surface 28 of the sandwiched structure to form upper and lower metallized layers 32 and 34, respectively, as shown in FIG. 7. The metallization can be deposited by well-known techniques, such as vacuum-deposition and electroplating, and may be formed of aluminum, chromium, or nickel. A second metallization layer (not shown) of gold may be deposited as an outermost metallized layer on both the top and bottom surfaces, in order to provide an optimal medium for the wirebonding of electrical leads.

Figure 8:
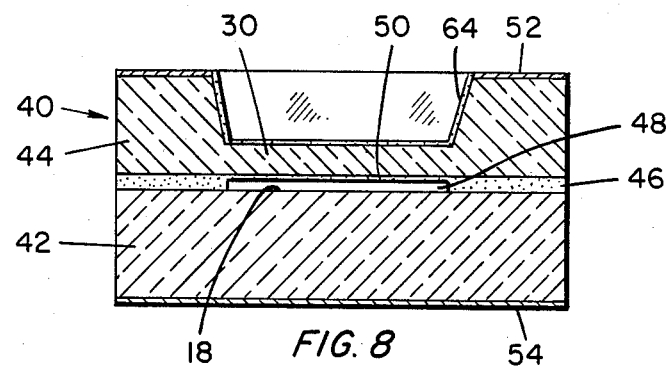
FIG. 8 is a simplified, cross-sectional view of a completed pressure sensor made in accordance with the present invention.

Finally, the matrix of sensors forming the sandwiched structure of FIG. 7 is cut up or "diced" into separate, individual silicon capacitive pressure sensors, one of which is shown in FIG. 8. The completed, discrete sensor, designated by the numeral 40 in FIG. 8, comprises a lower silicon plate 42 and an upper silicon plate 44, spaced apart and joined to each other by a silicon dioxide layer 46. Removal of the $SiO_2$ from the predefined areas 18 on the first (lower) wafer 10 leaves a dielectric gap 48 underlying the diaphragm 30 formed in the upper silicon plate 44, as described above. The thin $SiO_2$ layer 22 deposited on the second (upper) wafer 20 provides a dielectric layer 50 on the underside of the diaphragm 30. This dielectric layer 50 increases the capacitance of the sensor 40, as well as its dielectric breakdown voltage, while also preventing a short circuit from occurring should the diaphragm 30 come into contact with the lower silicon plate 42. When the sandwiched structure of FIG. 7 is cut into individual sensors, portions of the metallized layers 32 and 34 become metallized contacts 52 and 54 on the top and bottom surfaces, respectively, of the sensor 40.

An ambient pressure port (not shown) may optionally be provided into the gap 48 (which functions as a reference pressure chamber) through the lower plate 42, to provide ambient pressure as the reference pressure for measurements of gauge pressure. For absolute pressure sensors, the gap 48 is evacuated during the above-described fusing procedure.

Dimensionally, the sensor 40 is approximately 2.5 mm in width, with an overall thickness in the range of about 0.5 to 1.0 mm. The separation between the plates provided by the dielectric gap 48 is on the order of one micron or less.

For some applications, particularly where higher pressure ranges may be experienced, the step of etching the diaphragms 30 into the second (upper) wafer 20 may be eliminated. Instead, the second wafer may be provided with uniform thickness which is measurably less than the thickness of the first (lower) wafer 10. The result is a sensor having two conductive silicon plates, each of substantially uniform thickness, but with one plate sufficiently thin to be deflectable in response to pressures within the range to be measured. Different plate thickness could be used, depending upon the measured pressure range.

Figure 9:
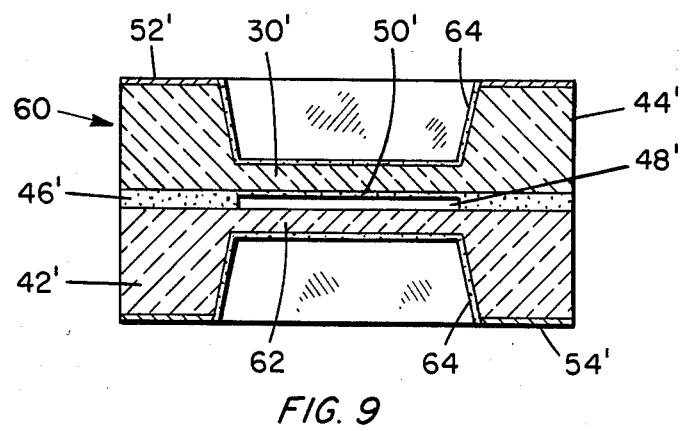
FIG. 9 a view similar to that of FIG. 8, showing a modified form of the completed sensor.

FIG. 9 illustrates a modified form of the sensor, designated by the numeral 60. The modified sensor 60 is, in most respects, identical to the sensor 40 of FIG. 8, having lower and upper plates, 42' and 44', respectively, and an intervening silicon dioxide layer 46'. Like the sensor 40, the modified sensor 60 has a diaphragm 30' etched into the upper plate 44', a dielectric gap 48' underlying the diaphragm 30', and a thin dielectric layer 50' of $SiO_2$ on the underside of the diaphragm 30'. Upper and lower electrical contacts, 52' and 54', respectively, are provided as described above.

The principal difference between the sensor 40 of FIG. 8, and the modified sensor 60 of FIG. 9, is the formation of a second diaphragm 62 in the lower plate 42' of the sensor 60. The second diaphragm 62 is provided on the opposite side of the dielectric gap 48' from the first diaphragm 30', and it is formed by applying the same masking, photo-resist, and chemical etching techniques, used to form the first diaphragm 30'. Provision of two diaphragms on opposite sides of the dielectric gap provides the sensor 60 with increased sensitivity.

For any embodiment described above, protection of the sensor from chemical interaction with the ambient medium can be provided by covering the exposed silicon surfaces with a deposited or thermally-grown silicon dioxide film 64, using a conventional $SiO_2$ deposition technique after the diaphragms 30 are etched. Alternatively, the sensor can be coated with a protective material such as silicon nitride, or even a varnish, as is known in the art.

Figure 4:
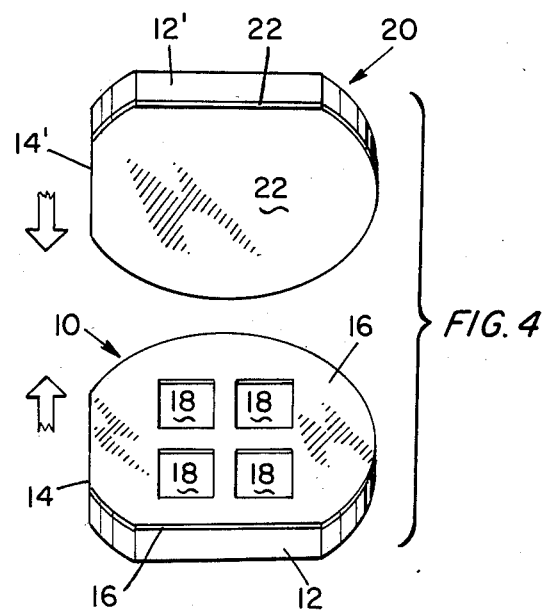
Figure 10:
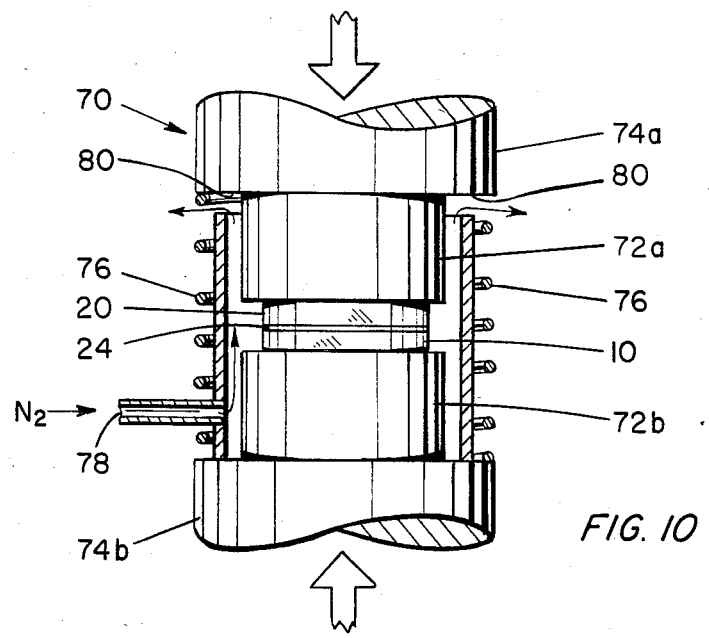
FIG. 10 is a semi-schematic diagram of a press used to fuse the two wafers which form the sensors, as shown in FIGS. 4 and 5.

FIG. 10 illustrates a press 70 suitable for fusing the wafers 10 and 20 together, as shown in FIGS. 4 and 5.

The press 70 comprises a pair of graphite susceptors 72a and 72b attached to upper and lower platens 74a and 74b, respectively. The silicon wafers 10 and 20 are placed between the susceptors 72a and 72b, with the oxidized surfaces 16 and 22 of the wafers facing each other. The wafers are pressed together between the susceptors 72a and 72b, while heat is applied by the energization of an RF coil 76 surrounding the operative part of the press. By applying a pressure of approximately 1000 psi, at a temperature of approximately 1000° C., the $SiO_2$ layers 16 and 22 of the wafers are sufficiently softened to allow them to fuse together. The above-specified temperature and pressure are preferably maintained for approximately five minutes for a good bond to be formed between the contacting $SiO_2$ layers.

The fusing procedure should be performed in an inert atmosphere to prevent further oxidation of the wafers. Accordingly, an inert gas, preferably nitrogen, is circulated through the interior of the press 70 from a gas inlet 78 to one or more outlets 80. If absolute pressure sensors are to be produced, the fusing procedure should be performed in a vacuum, with the interior of the press being evacuated by well-known techniques.

From the above description, it can be seen that the method of the present invention produces silicon capacitive pressure sensors that are inexpensive, small in size, and well-suited to high-temperature applications. Furthermore, the sensors so produced have very precisely-controlled dimensions. Also, because a very narrow dielectric gap can be produced with precision, relatively-high capacitances can be achieved, despite the small area of the plates. The relatively-high capacitance per unit area, in turn, provides increased pressure sensitivity. The fabrication method, itself, is relatively simple, requiring no exotic materials, and using conventional chemical etching techniques.

Although a preferred embodiment of the invention has been described, various modifications will suggest themselves to those skilled in the pertinent arts. For example, the sensors can be configured in any of a variety of shapes; circular, for example. Also, although the preferred embodiment has been described as constructed primarily of silicon, it is possible that other semiconductor materials can be employed, with some modifications of the fabrication process dictated by the choice of semiconductor material. These and other modifications should be considered within the spirit and scope of the invention, as defined in the claims which follow.

What is claimed is:

1. A method for making a capacitive pressure sensor comprising the steps of:
   (1) providing first and second wafers of conductively-doped semiconductor material;
   (2) oxidizing a major surface of each of said wafers to form a layer of oxidized material thereon;
   (3) removing a predefined area of said oxidized layer from said first wafer, leaving an uncovered surface of unoxidized semiconductor material in said predefined area;
   (4) superimposing said second wafer onto said first wafer so that the oxidized layer of said second wafer is in contact with the oxidized layer of said first wafer around said predefined area;
   (5) applying sufficient heat and pressure to said first and second wafers to fuse together the contacting oxidized layers;
   (6) metallizing preselected areas of the outer surfaces of the fused-together first and second wafers to form a metallized layer on each of said outer surfaces; and
   (7) cutting the fused-together wafers to form at least one capacitive pressure sensor having first and second conductive semiconductor plates separated by a gap formed between said uncovered surface in said predefined area of said first wafer and the opposed oxidized layer of said second wafer, each of said plates including a portion of one of said metallized layers on its outer surface.

2. The method of claim 1, further comprising the step of:
   after fusing said first and second wafers together, and before metallizing said preselected areas of the outer surfaces of said wafers, forming a recess in the outer surface of at least one of said wafers in an area aligned and in registration with said uncovered surface of unoxidized semiconductor material.

3. The method of claim 1, wherein said semiconductor material is essentially comprised of conductively-doped silicon.

4. The method of claim 3, wherein said silicon has been doped to attain a bulk resistively in the range of approximately 0.005 approximately 0.010 ohm-centimeters.

5. The method of claim 3, wherein said step of fusing said first and second wafers comprises the step of subjecting the superimposed wafers to a pressure of at least approximately 1000 pounds per square inch at a temperature of at least approximately 1000° C.

6. The method of claim 1, wherein said oxidizing step comprises the steps of:
   (a) oxidizing a major surface of said first wafer to form a first oxidized layer thereon; and
   (b) oxidizing a major surface of said second wafer to form a second oxidized layer thereon having a thickness which is substantially less than the thickness of said first oxidized layer.

7. The method of claim 6, wherein the thickness of said second oxidized layer is approximately one-tenth the thickness of said first oxidized layer.

8. The method of claim 6, wherein the thickness of said first oxidized layer is in the range of approximately 1.0 to approxmately 1.2 microns, and the thickness of said second oxidized layer is in the range of approximately 0.10 to approximately 0.12 microns.

9. The method of claim 1, wherein said predefined area of said first wafer from which said oxide layer is removed comprises a matrix of plural separate predefined areas, each having an uncovered surface of semiconductor material, and wherein said cutting step comprises the step of cutting the fused-together wafers to form a plurality of capacitive pressure sensors each having first and second conductive semiconductor plates separated by a gap formed between the uncovered surface in one of said plural predefined areas of said first wafer and the opposed oxidized layer of said second wafer.

10. A method for making a capacitive pressure sensor comprising the steps of:
   (1) providing first and second wafers of conductively-doped silicon;
   (2) oxidizing a major surface of each of said wafers to form a layer of silicon dioxide therein;
   (3) removing silicon dioxide from a matrix of plural separate predefined areas on the oxidized major surface of said first wafer, leaving an uncovered surface of silicon in each of said predefined areas;

(4) superimposing said second wafer onto said first wafer so that the silicon dioxide layer of said second wafer is in contact with the silicon dioxide layer of said first wafer around and between said predefined areas;

(5) fusing together the contacting silicon dioxide layers by the application of heat and pressure to said first and second wafers;

(6) metallizing pre-selected areas of the outer surface of the fused-together first and second wafers to form a metallized layer on each of said outer surfaces; and (7) cutting the fused-together wafers to form a plurality of capacitive pressure sensors each having first and second conductive silicon plates separated by a gap formed between the uncovered silicon surface in one of said plural predefined areas and the opposed silicon dioxide layer of said second wafer, each of said plates including a portion of one of said metallized layers on its outer surface.

11. The method of claim 10, further comprising the step of:
after fusing said first and second wafers together, and before metallizing said pre-selected areas of the outer surfaces of said wafers, forming a matrix of recesses in the outer surface of at least one of said wafers, each of said recesses being aligned and in registration with the uncovered surface of silicon in one of said predefined areas on said first wafer.

12. The method of claim 10, wherein the silicon dioxide layer on said first wafer is substantially thicker than the silicon dioxide layer on said second wafer.

13. The method of claim 12, wherein the silicon dioxide layer on said first wafer is approximately ten times as thick as the silicon dioxide layer on said second wafer.

14. The method of claim 12, wherein the silicon dioxide layer on said first wafer has a thickness of approximately 1.0 to 1.2 microns, and the silicon dioxide layer on said second wafer has a thickness of approximately 0.10 to 0.12 microns.

15. The method of claim 10, wherein said fusing step is conducted at a temperature of at least approximately 1000° C. and a pressure of at least approximately 1000 pounds per square inch.

16. A silicon capacitive pressure sensor manufactured by a method comprising the steps of:
(1) providing first and second wafers of conductively-doped silicon;
(2) forming a first layer of silicon dioxide on a major surface of said first wafer and a second layer of silicon dioxide on a major surface of said second wafer;
(3) forming a matrix of plural, separate uncovered silicon areas on said first wafer by removing a matrix of predefined areas of said first silicon dioxide layer;
(4) bringing said first and second silicon dioxide layers into mutual contact under sufficient heat and pressure to effect a fusing together of said first and second wafers at the contacting portions of said first and second silicon dioxide layers;

(5) forming a metallized layer on an outer surface of each of the fused-together wafers; and (6) cutting the fused-together wafers into a plurality of capacitive pressure sensors each having first and second conductive silicon plates separated by a gap formed between the uncovered silicon in one of said plural predefined areas in said first wafer and the opposed silicon dioxide layer on said second wafer, each of said plates including a portion of one of said metallized layers on its outer surface.

17. The pressure sensor of claim 16, wherein at least one of said plates includes a diaphragm which is deflectable into said gap in response to a pressure applied thereto.

18. The pressure sensor of claim 17, wherein said diaphragm is formed by a recess in the outer surface of one of said plates, said recess being aligned and in registration with said gap.

19. The pressure sensor of claim 16, wherein said gap separates said first and second conductive silicon plates by a distance of approximately one micron or less.

20. The pressure sensor of claim 19, wherein said first silicon dioxide layer has a thickness of approximately 1.0 to 1.2 microns, and said second silicon dioxide layer has a thickness of approximately 0.10 to 0.12 microns.

21. The pressure sensor of claim 16, wherein said first silicon dioxide layer is substantially thicker than said second silicon dioxide layer.

22. The pressure sensor of claim 21, wherein said first silicon dioxide layer is approximately ten times as thick as said second silicon dioxide layer.

23. The pressure sensor of claim 16, wherein said first and second wafers are fused together by pressing them together at a pressure of at least approximately 1000 pounds per square inch at a temperature of at least approximately 1000° C.

24. A silicon capacitive pressure sensor, comprising:
first and second plates of conductively-doped silicon separated by a dielectric gap and joined to each other around said gap by fused-together layers of silicon dioxide; and
a metallized electrical contact on an outer surface of each of said plates;
whereby at least one of said plates is deflectable into said gap by the application of pressure to an outer surface thereof.

25. The pressure sensor of claim 24, wherein said dielectric gap is formed between a silicon dioxide-covered surface on one of said plates and an uncoverd silicon surface on the other of said plates.

26. The pressure sensor of claim 24, wherein each of said plates which is deflectable includes a pressure-responsive diaphragm formed by a recess in its outer surface, said recess being aligned and in registration with said dielectric gap.

27. The pressure sensor of claim 24, wherein said gap separates said first and second plates by a distance of approximately one micron or less.

28. The pressure sensor of claim 24, wherein said layers of silicon dioxide comprise essentially pure silicon dioxide.

* * * * *